United States Patent [19]

Wolf

[11] 4,044,338

[45] Aug. 23, 1977

[54] ASSOCIATIVE MEMORY HAVING SEPARATELY ASSOCIABLE ZONES

[75] Inventor: Gerhard Wolf, Munich, Germany

[73] Assignee: Siemens Aktiengesellschaft, Berlin & Munich, Germany

[21] Appl. No.: 654,615

[22] Filed: Feb. 2, 1976

[30] Foreign Application Priority Data

Feb. 10, 1975 Germany .............................. 2505477

[51] Int. Cl.$^2$ ....................... G06F 13/00; G11C 15/00
[52] U.S. Cl. ............................. 364/900; 340/173 AM
[58] Field of Search ...................................... 340/172.5

[56] References Cited

U.S. PATENT DOCUMENTS

| | | | |
|---|---|---|---|
| 3,387,272 | 6/1968 | Evans et al. ...................... | 340/172.5 |
| 3,576,543 | 4/1971 | Melliar-Smith ................... | 340/172.5 |

*Primary Examiner*—Raulfe B. Zache
*Attorney, Agent, or Firm*—Hill, Gross, Simpson, Van Santen, Steadman, Chiara & Simpson

[57] ABSTRACT

An associative memory has separately associable zones, a linearly addressable main memory for the input and read out of data consisting of an associative word and a non-associative word, and a comparator device which serves to compare the read out association words with a search word. A device containing address converters serves to derive the addresses from the association word and from the search word or from the higher-value bits of these words and an extension counter provides a count which influences the derivation of the addresses. The count is increased by one whenever an initially addressed storage position proves otherwise occupied. A reservation unit is provided with a shift network which, under the influence of an item of control information serving to delimit the zones, derives a secondary bit group having a width 1 of the complete addresses from a selectable part of the lower-value bits of a zone address and from a selectable part of the higher-value bits of a primary bit group derived from the association and search words, having the width 1, which it feeds to the device containing the address converters in order to form the store address in dependence upon the count of the extension counter.

4 Claims, 8 Drawing Figures

ASSOCIATIVE MEMORY HAVING SEPARATELY ASSOCIABLE ZONES

BACKGROUND OF THE INVENTION

1. Field of the Invention

This invention relates to an associative memory having separately associable zones, with a linearly addressable main memory for the input and read-out of data composed of an associative component and a non-associative component, with a comparator device serving to compare the read-out association words with a search word, with a device containing address converters, serving to derive the addresses from the association and search words or from the higher-value bits of these words, and with an extension counter whose count influences the derivation of the addresses and is increased by one when an initially addressed storage position proves occupied.

2. Description of the Prior Art

The German published application 2,319,468 discloses a storage device having a plurality of storage banks which, in turn, comprise a plurality of storage positions and which are each classified into an associative portion which can be addressed by a part (prefix) of the association and search word, and into a non-associative portion which serves to accommodate an assigned word. Each storage bank is assigned address converters for deriving the addresses from the association and search word in a manner which differs from storage bank to storage bank, with pseudo-statistical distribution, in such a manner that the prefix lines which connect to one another the storage positions, capable of being addressed by specific prefixes, of adjacent storage banks, form irregular lines. All of the entries on one prefix line are read out simultaneously.

A random accumulation of association words having the same prefix can give rise to this situation in which the storage positions available along a prefix line are not sufficient for the entry of the words. Therefore, the storage device is provided with an extension counter whose relevant count co-determines the formation of the addresses and is increased by one whenever a new entry of a word having a specific prefix is to be made and all of the storage positions along the relevant prefix line are already in use. Thus, the extension counter serves to provide additional addressing planes which can accommodate extensions of prefix lines.

The possibility of surveying the state of seizure along a prefix line considerably simplifies the allocation of free storage positions for new entries. Thus, on average, only two search cycles are required for the relocation of free storage positions when the memory is approximately 95% or more full. In the event of a reduction in the number of storage banks, however, the conditions rapidly deteriorate. The state of seizure becomes increasingly difficult to survey and, on account of the reduction in length of the prefix lines, the selection between equivalent storage positions becomes poor.

However, by means of the application of suitable measures, it is possible to advantageously also employ a linearly addressable main memory divided into pages and rows and possessing only one storage bank as an associative store. In this case, it is of considerable importance to provide a book-keeping memory in which the rows (words) are assigned to the pages of the main memory and the bit positions within the words are assigned to the rows within the pages of the main memory. By setting markings in the bit positions of the book-keeping memory for the rows of the main memory which are in use, it is possible to rapidly survey the particular state of seizure of the main memory.

The addresses for the pages and rows of the main memory are obtained from the association and search words, or from parts of these words. The bit positions employed for the address formation of the association and search words are referred to as prefix, irrespectively of whether the prefix comprises only the higher-value bit positions of these words or the entire words. There are various possibilities of deriving the page and row addresses of the main memory, these resulting in partially differing storage modes for new entries of association words. A common feature of all exemplary embodiments which will be discussed in detail hereinbelow is a page address converter which consists of a logic linking network or a small read only memory (ROM). At its output, the latter emits, in parallel, as many bits as are present at its input. It is generally possible to dispense with a special row address converter.

For many applications it is advantageous to employ a prefix comprising more bits than are necessary for addressing. The prefix is then compressed by logic linking networks by read-only memory.

As, generally speaking, the number of storage positions in the main memory is less than the number of possible combinations of all of the bit positions of the association words, independently of the special nature of the address information, a plurality of association words always lead to the same addresses. Therefore, it will frequently occur that a storage position in the main memory selected by the original page and row address proves to be already in use when a new association word is to be stored. However, since the state of seizure of the main memory is portrayed in the book-keeping memory, it is possible to allocate an equivalent storage position for the awaiting new entry, both easily and rapidly. For this purpose, an extension counter is provided, the relevant count of which co-determines the formation of the page addresses and, commencing from 0, is increased by one counter unit whenever the previously addressed storage position is already in use. In this manner, a chain of association words is constructed, which words are similar to one another and which all initially lead to the same addresses of the main memory.

In the formation of change of this kind, it is advantageous to control the translation function of the page address converter by a few (three or four, for example) low-value bits of the relevant count of the extension counter. The higher-value bits from the extension counter are added to the bits at the outut of the page address converter without increasing the number of digits (positions). The result of the addition represents the page address.

Memory contents often consists of a plurality of independent data groups, where the data within the individual groups are organizationally interrelated. Such data groups can, for example, be translation tables, decision tables, programs, program components, and the like. In the following discussion such groups will be referred to as independent tables. The processing of tables of this type in large associative memories comprising a plurality of independent tables is, in many cases, considerably simplified if the individual tables are allocated separately associable storage cells. Here, reference will only be made to the sorting of table contents in the case of which the entire memory would otherwise have to be systematically searched through.

SUMMARY OF THE INVENTION

Although the allocation of individual tables to separately associable storage zones is highly desirable, the division of the memory into fixed, physical zones involves the danger that such zones will not be exploited or that such zones will prove too small. Therefore, the object of the invention is to provide measures which permit the associative memory to be divided into separately associable zones, the capacity of which can at all times be adapted to the requirements of a particular installation. It goes without saying that this can only apply provided the overall capacity of the memory is not exceeded.

According to the invention, the above object is realized in an associative memory of the type described above in that a reservation unit is provided with a shift network which, under the influence of an item of control information which serves to delimit the zones, derives a secondary bit group having the width l of the complete address from a selectable part of the lower-value bits of a zone address and from a selectable part of the higher-value bits of a primary bit group derived from the association and search words, having the width l, which it conducts to the device containing the address converters in order to form the store address in dependence upon the count of the extension counter.

Here, it should be noted that the division of the memory into separately associable zones, provided in accordance with the invention, exists only in an organizational respect. No general statements can be made concerning the actual spatial positioning of these zones in the physical memory. The zones can, in fact, penetrate into one another.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
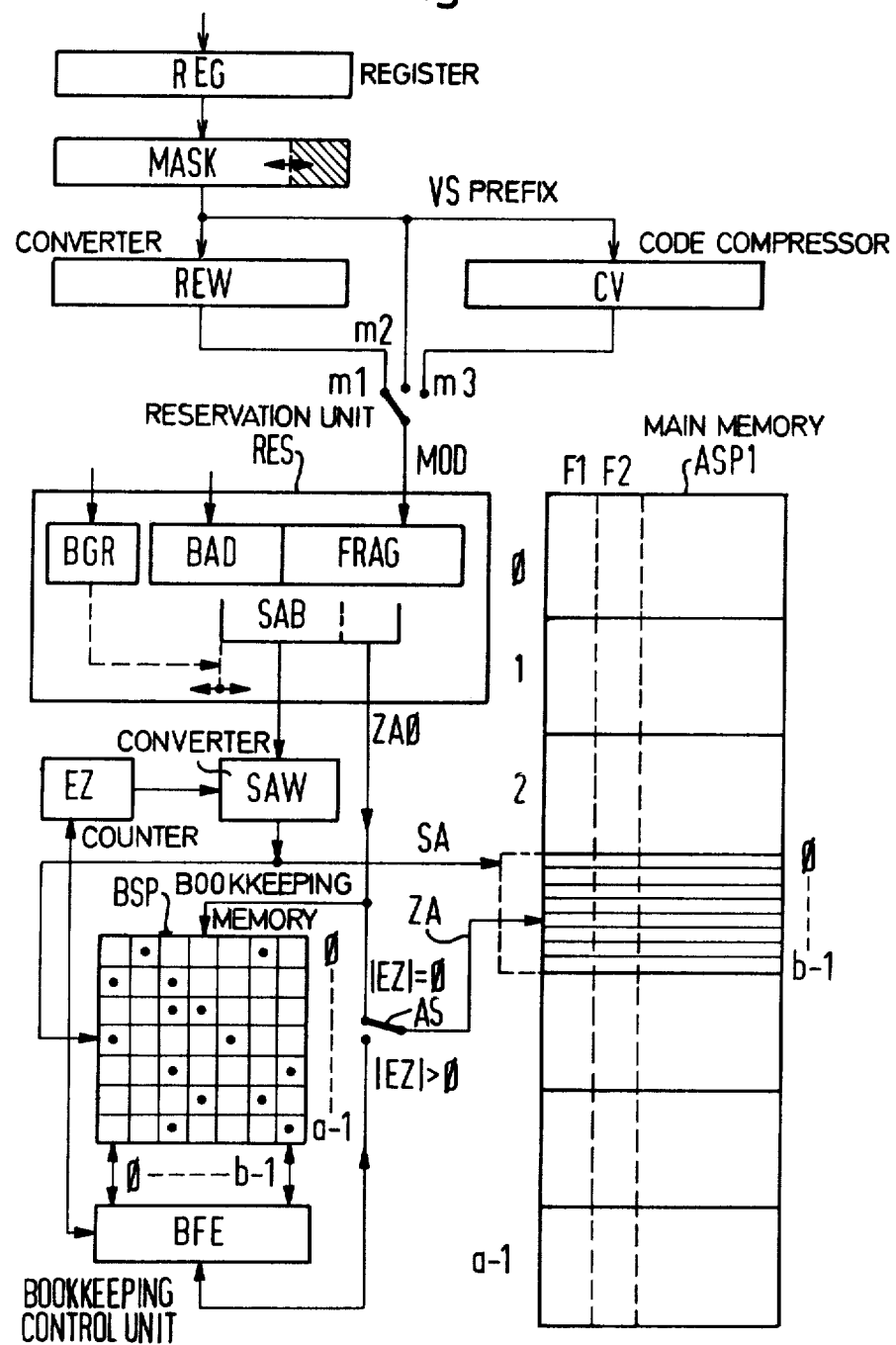
FIG. 1 is a block diagram plan view of an associative memory having a main memory provided with a storage bank and with additional cooperating devices.

FIG. 1 illustrates a main memory ASP1, which is divided into $a$ pages where $a = 2^m$ and $m$ is the number of higher value bits of a zone address, each of said pages comprising $b$ rows, where $b = 2^n$ and $n$ is the number of lower value bits of a zone address. Each storage row consists of the actual storage position which serves to accommodate the association word which is to be stored, and possibly a non-associative data component, and of two additional sections F1 and F2 for the entry of characteristics which will be discussed in the following. A comparator which is required for the associative comparison of the read-out data with the particular search word is not illustrated in FIG. 1. Also not shown are a mask register, whose variable content permits the zone taken into consideration in the associative comparison to be extended or restricted, and the address decoder required for selecting the storage positions.

The main memory ASP1 is assigned a bookkeeping memory BSP which can be read-out word by word. The bookkeeping memory BSP possesses as many words as there are pages in the main memory ASP1, and each word in the bookkeeping memory BSP consists of as many bit positions as there are rows in each page of the main memory. A marking bit (indicated by a dot on the drawing) is set in a bit position of the bookkeeping memory BSP when the relevant row of the main memory is occupied by an entry.

The bookkeeping memory BSP is advantageously in the form of a high-speed bipolar semiconductor store. This can be a reserved zone of a memory which is also used for other purposes. However, a portion of the memory serving as a main memory can possibly also be used for this purpose.

The bookkeeping memory BSP is assigned a bookkeeping control unit BFE, which carries out auxiliary functions. For example, the bookkeeping control unit BFE reads out the word in the bookkeeping memory BSP which has been selected by the page address SA of the main memory ASP1 and with the aid of a priority network selects the free storage position with the highest priority within the selected page of the main memory ASP1, when a storage position selected by the original row address ZA0 is already occupied. The bookkeeping control unit BFE also places the characteristics into the sections F1 and F2 of the main memory ASP1 and analyzes the characteristics read out from these sections. It also controls the extension counter EZ.

Figure 2:
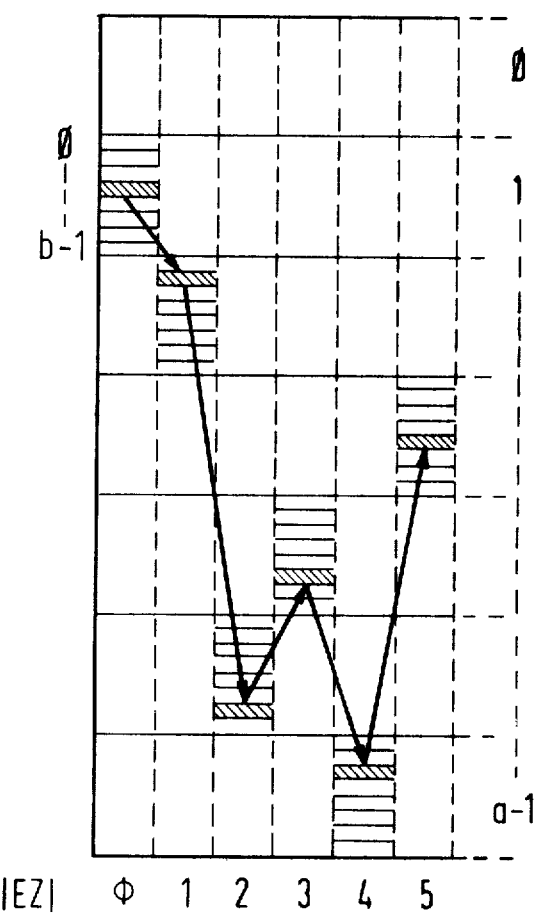
FIG. 2 is a graphic illustration of the course of chaining lines in dependence upon the count of the extension counter.

It has already been mentioned that the extension counter EZ is provided as an auxiliary means for the allocation of equivalent storage positions for new entries. Its relevant count co-determines the formation of the page addresses, and, commencing from 0, is increased by one counter unit whenever the previously addressed storage position is already occupied. The chain of similar association words constructed in this manner, all of which would initially lead to the same addresses, is illustrated in FIG. 2 in dependence upon the count $|EZ|$ of the extension counter EZ (EZ count). The irregular line formed by the arrows which connect the individual elements to one another is referred to as the chaining line. One and only one such chaining line can commence in any row of the main memory. However, it is not necessary for the chaining line to proceed onto another page of the main memory each time the count $|EZ|$ of the extension counter EZ is changed. In addition, it can occur that the individual EZ counts are skipped, because the main memory pages addressed with the cooperation of the skipped EZ counts are already completely occupied.

It is advantageous to use the address ZAO derived from the row address converter from the association word only in the case of the particular first element, i.e. with the count $|EZ| = 0$ of the extension counter EZ, for addressing the storage position. For the entries of the other chain elements ($|EZ| > 0$) free storage positions within the selected pages are established with the aid of the bookkeeping store BSP.

The systematic construction of a chaining line and the relocation of the association words stored along the chain line necessitates that reference characteristics should be entered in the sections assigned to each storage position. All of the reference characteristics consists of the indication of a specific count of the extension counter EZ and a row address (within a page of the main memory). It is advantageous to provide two sections F1 and F2, and to proceed in the following manner.

Figure 3:
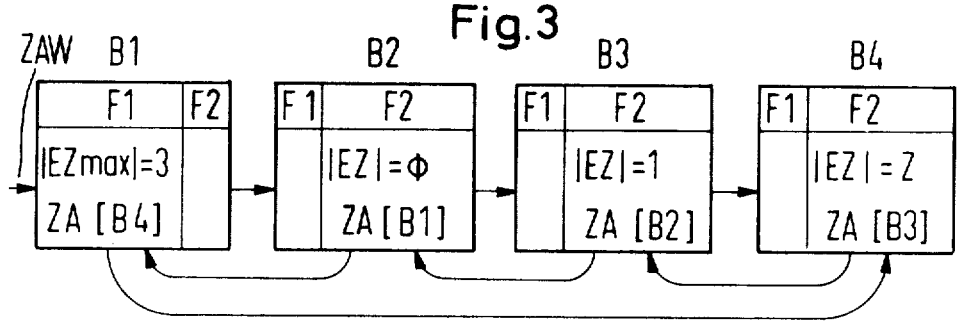
FIG. 3 is a block diagram illustrating the entry of reference characteristics in sections assigned to the storage positions.

The section F1 of the initial element of a chain (beginning row) contains a reference to the relevant end of the chain. The sections F2 of all the other elements contain information relating to the particular preceding element. FIG. 3 illustrates the reference characteristics of a four-element chain composed of the words B1 to B4. The chain is constructed from left to right and, beginning from the section F1 on the left-side, is read out or disestablished from right to left.

The devices of the arrangement illustrated in FIG. 1 which have not yet been previously mentioned serve to derive the memory addresses from the association and search words contained in the register REG. The function of the extension counter EZ in association with the address information has already been discussed. The various possibilities of obtaining the memory addresses may be divided into three main groups which result in different storage modes. It is expedient, as illustrated in FIG. 1, to simultaneously present the details corresponding to the three groups, which can then be employed selectively in accordance with the particular requirements. Selection between the various forms of address derivation is made with the aid of a multi-pole transfer device which is symbolized by the switch MOD. In dependence upon the position of this switch, the mask MASK is also altered.

In all of the positions of the switch MOD, a bit combination with a uniform number of bit positions, the fragment FRAG, is switched through. The number of bit positions correspond to the sum of the bits in the page and row address. In the central position $m2$ of the switch MOD, the fragment FRAG is identical with the prefix VS which has been gated out of the association word (or search word) by an appropriate setting of the mask MASK.

Figure 4:
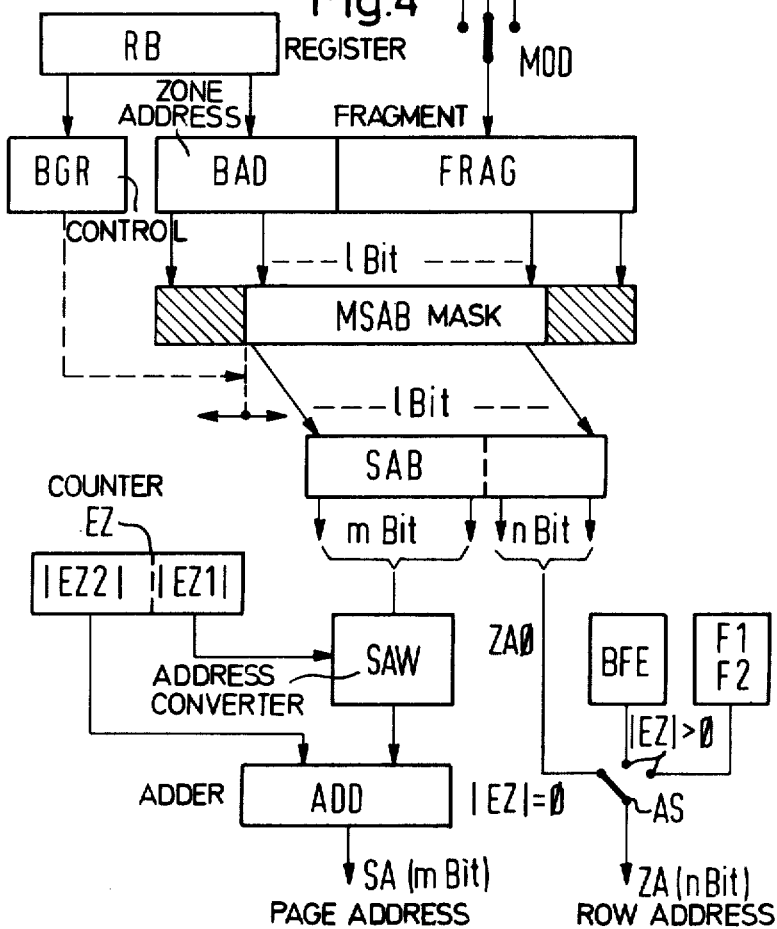
FIG. 4 is a block diagram illustration of an arrangement for deriving addresses for the main memory from the association and search words.

The further processing of the fragment, in particular with the aim of achieving a division of the memory into separately associable zones, is diagrammatically illustrated in FIG. 1. This further processing will be described in detail making reference to FIG. 4. A register RB, when called up (per program) supplies an item of control information BGR to delimit the zones and a zone address BAD. The control information BGR serves to control a shift network which in FIG. 4 is represented by a displaceable mask MSAB which is provided with a uniform diagram opening and by a section SAB (as in German allowed application 1,916,377). The opening in the mask MSAB is displaced under the influence of the control information BGR in such a manner that more or less of the higher-bits of the fragment FRAG are picked up and conveyed into the section SAB. At the maximum, the entire fragment FRAG will be fed into the section SAB. In addition, as many low-value bits of the zone address BAD are picked up as low-value bits of the fragment FRAG are excluded. The $n$ low-value bits of the bit combination contained in the section SAB are employed directly as row addresses for the main memory. The remaining $m$ high-value bits of the bit combination are fed to a page address converter which consists of a logic linking network or a read only memory (ROM). The portion $|EZ1|$ of the contents of the extension counter EZ, which portion consists of a few (e.g. three or four) low-value bits, controls the translation function of the page address converter SAW. The portion $|EZ2|$ contain the higher-value bits of the contents of the extension counter is modulo $2^m$ added in an adder ADD to the bits supplied by the page address converter SAW. The result of the addition represents the page address SA for the main memory.

Figure 5:
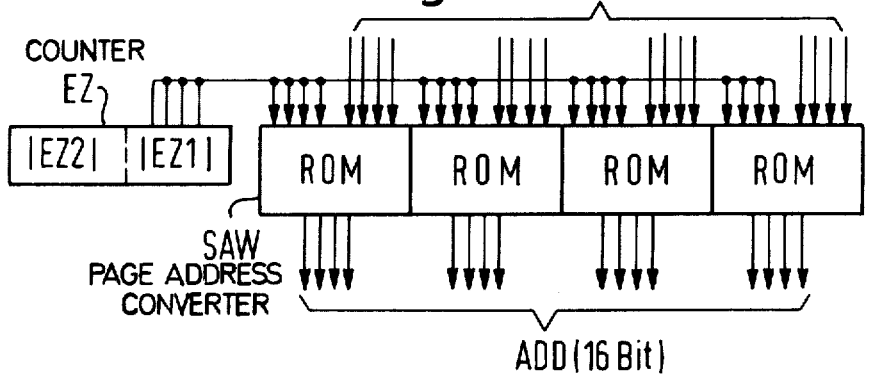
FIG. 5 is a block diagram of an exemplary embodiment of an address converter.

An exemplary embodiment of the page address converter SAW which serves to process 16 bits and consisting of commercially available read only memory (ROM) modules is illustrated in FIG. 5. Each ROM module receives a group of four bits from the oblique offering device SAB and the four lowest-value bits of the extension counter EZ as an address, the latter being fed to all four ROM modules. The called up store contents of the ROM modules are withdrawn, in each case, via four output lines.

It has already been discussed that the row address ZA0 derived from the fragment FRAG and from the association word is used only to address the beginning row of a prefix line, i.e. only in the case of the count 0 of the extension counter. To illustrate this, FIG. 4 represents a symbolic switch AS having three positions. The entered (right) position of the switch AS governs the situation $|EZ| = 0$. The two other positions are assumed by the switch AS whenever the count of the extension counter differs from 0 ($|EZ| > 0$). Under this condition, the central position governs a write-in cycle in which the row address is established by the bookkeeping control unit BFE with the aid of the bookkeeping memory BSP. The switch AS occupies the write-in position during a search process in which, together with the read-out of the words along a chaining line, the row addresses contained in the reference characteristics of the elements belonging to the chain are also read out.

The separately associable zones produced by the function of the shift network are established as being only for primary entries ($EZ = 0$) by the fragment FRAG, the zone address BAD and the control information BGR. They act in the manner of elastic balloons whose size can be arbitrarily increased or reduced irrespectively of this input opening. Naturally, it is not possible to exceed the overall available storage space. If the zone available for primary entries is not sufficient, they by way of an extension, an arbitrary number of secondary entry positions are made available, whereby chains are formed on the chaining lines defined in FIG. 2. Because of the possibility of allocating free storage positions with the aid of the book-keeping memory BSP, in this case the entries are made without any essential obstructions. No crossing over of chaining lines occur.

The form of address derivation which occurs with the central position $m2$ of the switch MOD (FIG. 4) and which has been described in detail in the foregoing, provides a storage mode capable of effecting sorting for the input association words. It is particularly suitable for sorting words in accordance with a dual-numerical classification. For this purpose, it is possible to use a sorting counter which calls up all of the chaining lines consecutively in this sequence. The individual contents which are entered along a chaining line, but have not yet been sorted from one another, are fed to an associative register set, and from the latter are emitted in the final sorting sequence. This final sorting can, for example, be effected in accordance with a sorting process proposed in the German Pat. application P 23, 42, 660.0, and will not be discussed in detail herein.

With the described mode of storage, it must be accepted that longer chains may arise. This hardly results in any disadvantages regarding sorting, although time losses occur in associative searching for individual words. Therefore, it is expedient to employ this mode of storage only when words are to be output, in particular, dual-numerically sorted.

The last described disadvantage is avoided by "diffused" storage of the words in the main memory. However, in this case the possibility of direct sorting of the memory contents is practically lost because the sorting of words stored in diffused fashion would result in too high of a time outlay. If sorting is nevertheless to be effected, a previous relayering into a storage mode capable of effecting sorting is to be recommended.

Diffused storage is achieved in that the prefix VS used for the address formation is extended by appropriate control of the mask MASK to considerably more bit positions than are required for addressing the main memory. The required reduction in the multi-digit prefix to the fragment FRAG, which possesses a smaller number of bit positions, is achieved by means of a reduction converter REW which is actuated in the position $m1$ of the switch MOD. The reduction converter REW preferably consists of a read only memory which is addressed by the prefix VS and which at its output emits the various bit combinations of the fragment FRAG. Naturally, different prefixes VS here supply the same fragments FRAG.

The extension of the prefix zone improves the statistical distribution of words among the various chaining lines in such a manner that the number of longer chains is drastically reduced. It is then extremely rare that chains comprising more than four elements occur. Accordingly, associative search processes can be handled rapidly, as it is hardly likely that more serial search processes will arise.

In the third position $m3$ of the switch MOD an address formation is carried out which likewise leads to a storage mode capable of effecting sorting. This mode is suitable for the later sorting of the words in an alphanumerical sequence. For the execution of this type of sorting, which will not be discussed in detail here, it is possible to utilize a sorting process also proposed in the aforementioned German patent application P 23, 42, 660.0.

In the position $m3$ of the switch MOD the fragment FRAG is obtained with the aid of a code compressor CV from the prefix VS (see FIG. 1). As the usual codes for letters and digits in fact only cover a small part of the 256 offered combination possibilities, undesirably long chains can occur without the provision of additional measures. The code compressor CV reduces the number of bit positions of the code to the required level and eliminates all unused combinations from the start.

Figure 6:
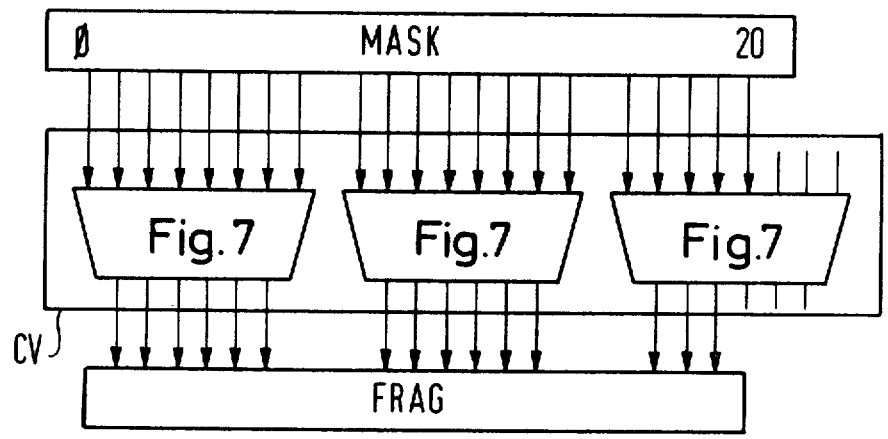
FIG. 6 is a block diagram illustration of an arrangement for supplementing the arrangement illustrated in FIG. 4 (code compressor)
Figure 7:
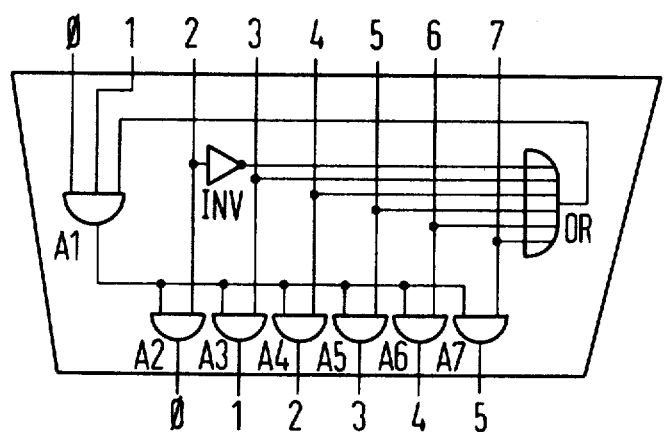
FIG. 7 is a schematic logic diagram of a module of the arrangement illustrated in FIG. 6.

A code compressor set up for the EBCDI code and consisting of three individual modules is schematically illustrated in FIG. 6. The code compressor employs a prefix VS comprising 21 bits which it compresses into a fragment FRAG comprising 16 bits. FIG. 7 illustrates an individual module of the code compressor CV having eight input terminal 0–7, and six output terminals 0–5. This consists of the AND gates A1–A7, the OR gate OR and the inverter INV. Its construction is clearly shown in the drawing. If FIGS. 6 and 7 are compared it is readily apparent that in the code compressor CV on the right-hand side, in each case, three input lines and three output lines are not used.

The division of an associatively operated memory into separately associable zones in the described fashion can be achieved not only in combination with a main memory having one storage bank, but also in the case of a storage arrangement consisting of a plurality of equivalent storage banks.

Figure 8:
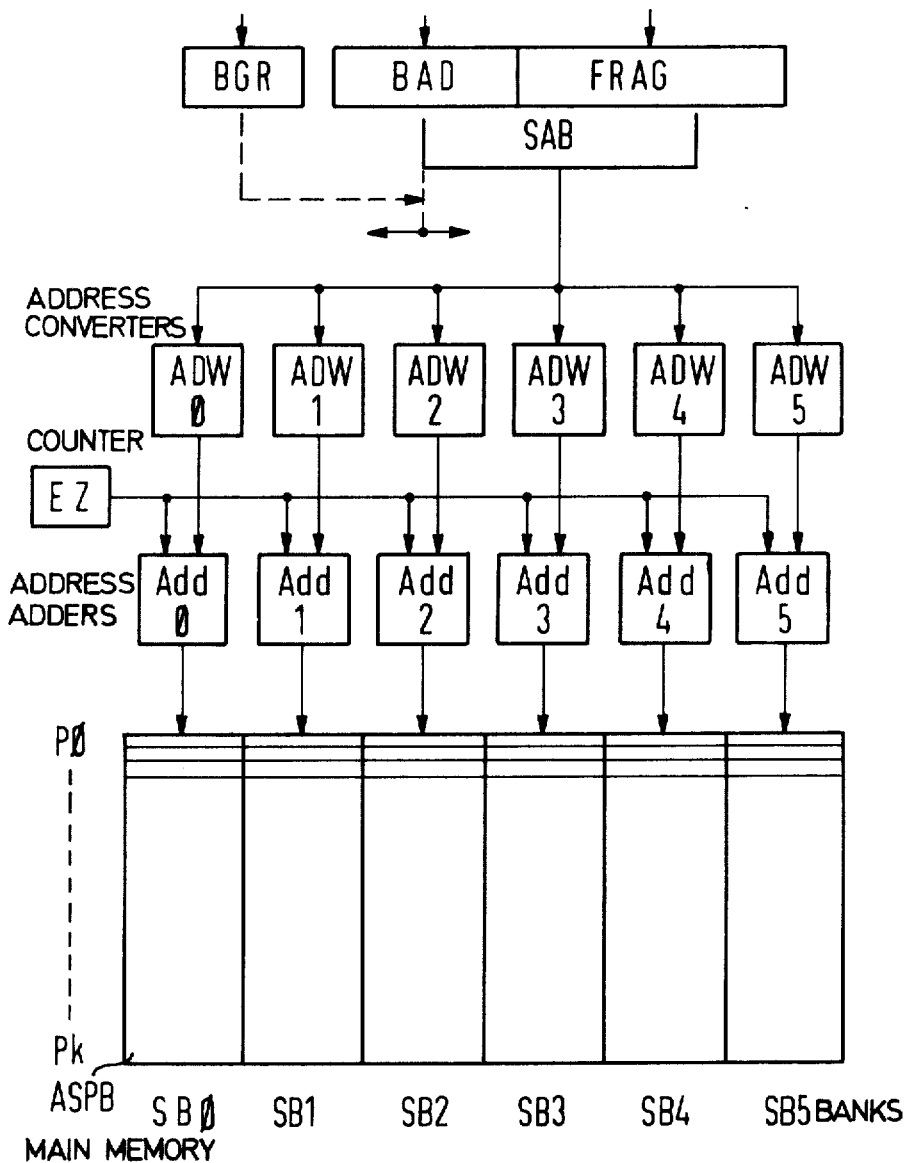
FIG. 8 is a block diagram illustration of an associative memory having a main memory comprising a plurality of storage banks, and showing additional co-operating devices.

FIG. 8 illustrates an exemplary embodiment of a storage device known through the aforementioned German published application 2,319,468, supplemented in accordance with the invention by the additional device which serves to divide the store into separately associable zones. The actual memory ASPB consists of six (preferably eight) storage banks SB0–SB5, each of which possesses a plurality of storage positions P0–Pk. For the addressing of the storage positions, each storage bank is assigned an address converter ADW0–ADW5. Each address converter possesses a different translation function, so that a fragment FRAG present at the outputs of the address converters supplies a different address for each storage bank. If all of the storage positions addressed by a specific fragment FRAG are connected, a chaining line of irregular course is produced. The chaining lines are extended by causing the extension counter EZ to count upwards whenever all of the storage positions along a chaining line are already in use and by adding the contents of the counter to the output values of the address converts.

The bit combination at the input of the address converts is supplied by a shift network which, in the manner already described, contains the higher-value bits of a fragment FRAG and the lower-value bits of a zone address BAD. The shift of the shift network is controlled by the control information BGR to limit the zones. The fragment FRAG can be obtained from the association word in any manner known from the German Published application 2,319,468. As in the storage arrangement comprising a plurality of storage banks, even when a division has been made into separately associable zones, chaining lines can overlap for each input association word, the entire zone address BAD which co-determined the derivation of its address (in part), it also stored for the clear identification of the word. An overlap of chaining lines it to be understood as a situation in which one storage positions belongs to two or more chaining lines.

Although I have described by invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In an associative memory of the type wherein there are separately associable zones, a linearly addressable main memory for input and read out of data consisting of an associative component and a non-associative component, a comparator for comparing the read-out association words with the search word, a device including address converters for deriving addresses from at least the higher-value bits of association and search words, and an extension counter connected to the address converters whose count influences the derivation of the addresses and whose count is increased by one in response to an initially addressed storage position being occupied, the improvement therein comprising:

a reservation unit connected in front of said device which includes said address converters, said reservation unit including a shift network for receiving zone delimiting control information and a selected part of the lower-value bits of a zone address and a fragment which is a selected part of the higher-value bits of a primary bit group having a width 1 and derived from the association and search words, and responsive thereto to derive and provide said device including address converters with a secondary bit group having a width 1 of a complete address in order for the address converters to provide, in conjunction with said extension counter, a memory address.

2. An improved associative memory according to claim 1, wherein said reservation unit comprises a register including a first section for storing said zone delimiting control information, a second section for storing a zone address, and a third section for storing said fragment, and a displaceable mask having a constant opening width.

3. An associative memory according to claim 2, wherein said main memory includes a linearly addressable storage bank comprising $a$ pages, where $a = 2^m$ amd $m$ is the number of higher value bits of a zone address, each page having $b$ rows, where $b = 2^n$ and $n$ is the number of lower-value bits of a zone address, and comprising a bookkeeping memory connected to said main memory and operated to be ready word-by-word, each word corresponding to a separate page of said main memory and each bit position of a word corresponding to a separate row of the respective page, and a bookkeeping control unit connected to said bookkeeping memory and to said reservation unit for making and indicating occupied ones of said storage positions and selecting equivalent unoccupied storage positions.

4. An improved associative memory according to claim 2, wherein said main memory comprises a plurality of storage banks each including a plurality of storage banks assigned a respective address converter which is responsive to bit combinations supplied address converter which is responsive to bit combinations supplied by said shift network to selectively provide the addresses of the respective storage positions under the control of said extension counter in a manner which differs from one bank to the next

* * * * *